United States Patent [19]

Sugai et al.

[11] Patent Number: 4,737,991
[45] Date of Patent: Apr. 12, 1988

[54] AUDIO MULTIPLEX TELEVISION TUNER

[75] Inventors: Yoshiro Sugai; Hiroyuki Kimura, both of Saitama, Japan

[73] Assignee: Pioneer Electronic Corporation, Tokyo, Japan

[21] Appl. No.: 861,184

[22] Filed: May 9, 1986

[30] Foreign Application Priority Data

May 10, 1985 [JP] Japan .................... 60-97962

[51] Int. Cl.⁴ ............................. H04H 5/00
[52] U.S. Cl. ................................. 381/13
[58] Field of Search ............ 381/10, 11, 13, 106, 381/98

[56] References Cited

U.S. PATENT DOCUMENTS

| 4,032,717 | 6/1977 | Mallon | 381/11 |
| 4,157,455 | 6/1979 | Okatani et al. | 381/11 |
| 4,379,207 | 4/1983 | Kubota | 381/13 |
| 4,408,098 | 10/1983 | Kamalski | 381/11 |

Primary Examiner—Forester W. Isen
Attorney, Agent, or Firm—Sughrue, Mion, Zinn, Macpeak, and Seas

[57] ABSTRACT

In a sound multiplex television tuner, when the input field strength becomes smaller than a certain value, a level control means continuously attenuates the sub signal demodulation output with the aid of the field strength detection signal which a field strength detector circuit provides according to the input field strength. The characteristic of response to input field strength of the level control means is switched, according to a given sound multiplex mode, so that its operation becomes most suitable for the sound multiplex mode, thereby to suppress the noise without causing the television viewer to feel a sense of incongruity in the perceived sound.

8 Claims, 10 Drawing Sheets $C_1 \gg C$

AUDIO MULTIPLEX TELEVISION TUNER

BACKGROUND OF THE INVENTION

1. Field of the Invention

This invention relates to an audio multiplex television tuner for receiving audio multiplex television broadcasts, which is suitable, for instance, for vehicles.

2. Background Art

A conventional sound multiplex television tuner of this type is as shown in FIG. 1. The tuner is connected to an antenna 1 and includes a front end 2, a video intermediate frequency amplifier (PIF) 3, a video detector 4, a frequency conversion circuit 5, a sound intermediate frequency amplifier circuit (SIF) 6, a sound detector 7, a sound multiplex sub-signal demodulation circuit 8, and de-emphasis circuits 9m and 9s. A Q signal detector circuit 10 identifies control signals representing broadcast modes, namely, a stereo broadcast or a bilingual broadcast. A mode switching circuit 11 provides a mode switching signal in response to the control signal identifying operation of the detector circuit 10. A mode designation input to the mode switching circuit 11 can be manually set to override the stereo capability or to select an alternate mode, such as the bilingual broadcast. The output of the mode switch 11 controls a matrix circuit 12, receiving outputs of the deemphasis circuits 9m and 9s.

In the television tuner thus organized, a main signal (L+R), which is provided at the output terminal of the second detector 7, is applied through the deemphasis circuit 9m to the matrix circuit 12, while a subsignal, which is provided at the output terminal of the sub-signal demodulation circuit 8, is supplied through the other de-emphasis circuit 9s to the matrix circuit 12. As a result of which, the matrix circuit 12 outputs sound signals separated into the right and left channels.

Heretofore, FM stereo tuners have extensively employed a noise suppression circuit which changes the separation according to the field strength of a signal received. Applying the noise suppression circuit to the sound multiplex television tuner, as it is, causes no trouble in a stereo mode. However, in a bilingual mode or an alternate sound mode such as an SAP (Separate Audio Program) mode in the U.S.A., the tuner may output only the sub-signal. If only the sub-signal is outputted, the person will experience a strong sense of incongruity. Thus, in the case of a bilingual mode or an alternate sound mode, it is not practical to apply the noise suppression circuit to the sound multiplex television tuner as it is.

The present inventors have filed a U.S. patent application, Ser. No. 726,753 on Apr. 24, 1985, incorporated herein by reference. In that application, the inventors showed in FIG. 3 a prior art sound multiplex tuner. In FIG. 2 of the present application is shown a tuner circuit similar to that of Ser. No. 726,753. Therefore, further discussion of FIG. 2 will be omitted. This tuner receives a multiplexed broadcast according to the U.S. method.

SUMMARY OF THE INVENTION

Accordingly, an object of this invention is to eliminate the above-described difficulty accompanying a conventional sound multiplex television tuner.

More specifically, an object of the invention is to provide a sound multiplex television tuner in which the operation is switched according to a given sound multiplex mode so that it is most suitable to the selected sound multiplex mode, thereby suppressing the noise without causing the person to feel a sense of incongruity.

The foregoing object and other objects of the invention have been achieved by the provision of a sound multiplex television tuner which, according to the invention, includes a field strength detector circuit for detecting an input field strength and which outputs a field strength detection signal according to the input field strength thus detected. A level control means continuously attenuates, when the input field strength becomes smaller than a predetermined value, a sub signal demodulation output with the aid of the field strength detection signal outputted by the field strength detection circuit. The characteristic of response to input field strength of the level control means is switched according to a given sound multiplex mode.

The nature, principle and utility of the invention will become more apparent when read in conjunction with the accompanying drawings.

DETAILED DESCRIPTION OF THE INVENTION

Figure 1:
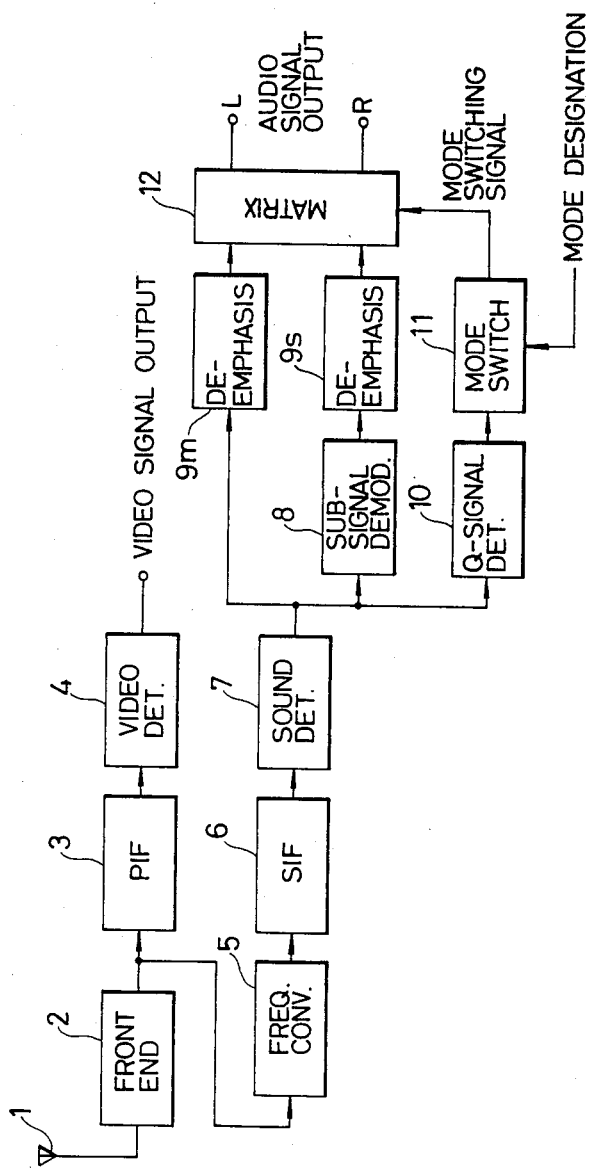
FIG. 1 is a block diagram showing one example of a conventional sound multiplex television tuner.
Figure 3:
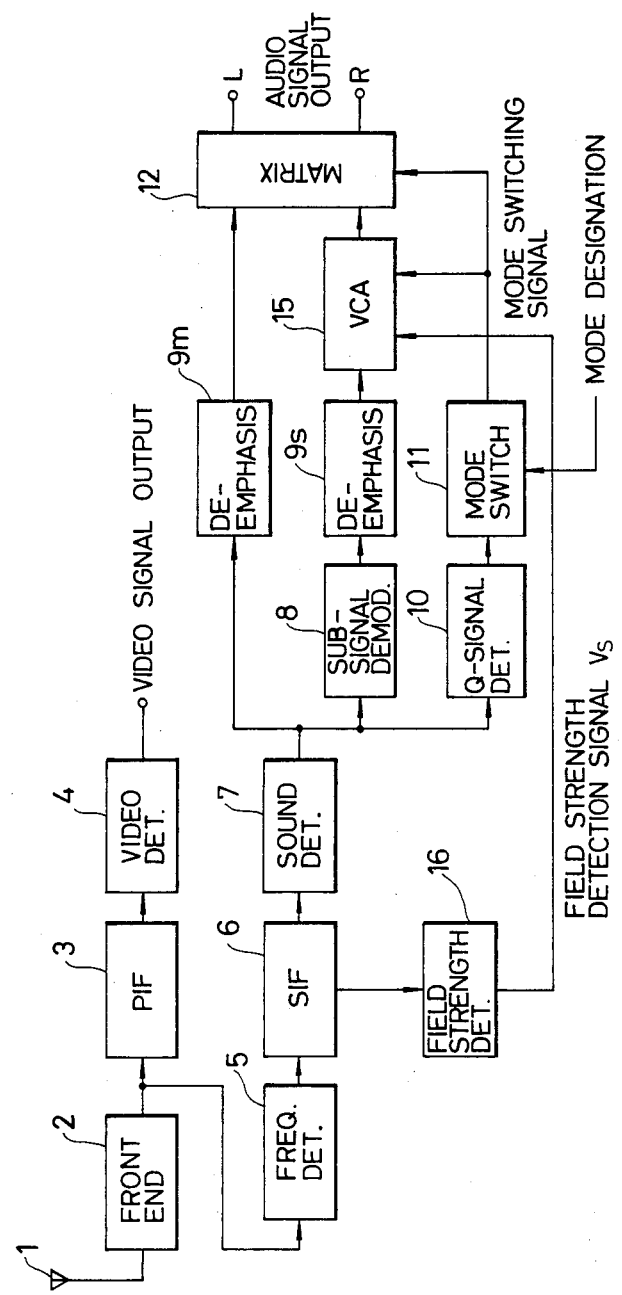
FIG. 3 is a block diagram showing a first example of a sound multiplex television tuner according to this invention.

A first example of a sound multiplex television tuner according to this invention is as shown in FIG. 3, in which those circuit elements which have been described with reference to FIG. 1 are therefore designated by the same reference numerals or characters.

In FIG. 3 includes means for controlling a signal level, namely, a voltage-controlled attenuator (VCA) 15. The attenuator 15 continuously attenuates the demodulation output of the sub-signal demodulation circuit 8 which has passed through the de-emphasis circuit 9s, in response to a field strength detection signal provided by a field strength detector circuit 16 (to be described later). The mode switching circuit 11 provides mode switching signals to change the maximum attenuation of the voltage-controlled attenuator 15, the start point of an attenuation (i.e., an input field strength), and a response time constant to variations of the input field strength.

Figure 4:
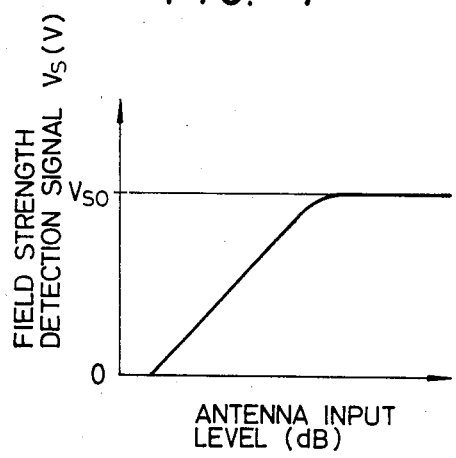
FIG. 4 is a graphical representation indicating the output characteristic of a field strength detection circuit in FIG. 3.
Figure 5:
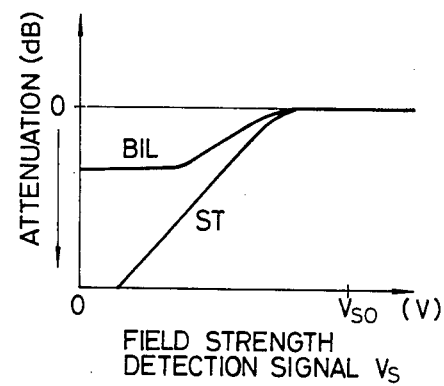
FIGS. 5 and 6 are graphical representations indicating the output characteristics of a voltage-controlled attenuator (VCA) in FIG. 3.
Figure 6:
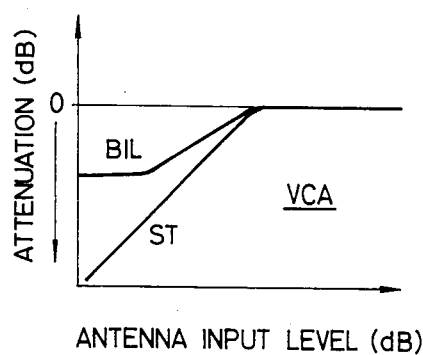

The field strength detector circuit 16 has a transfer characteristic such that an output field strength detection signal Vs changes with respect to an input antenna input level as shown in FIG. 4. The voltage-controlled attenautor 15 has a VCA characteristic that an output level relative to its primary input (i.e., an attenuation level) changes as a function of the field strength detection signal Vs, as shown in FIG. 5. Therefore, with respect to the antenna input level, an attenuation of the output at the output terminal of the attenuator 15 depends upon the antenna input level as shown in FIG. 6. In FIGS. 5 and 6, reference character ST designates a characteristic in a stereo mode, and BIL, a characteristic in a bilingual mode. As is apparent from the characteristic curves, the maximum attenuation, and the gradient of the attenuation with respect to variation of the input field strength are larger in the stereo mode than those in the bilingual mode. In practice, the field strength at which the attenuation is started may be set to a lower value in the bilingual mode, or the response time constant to the input field strength variation may be so determined that, in the stereo mode, a faster response is provided to a decrease of the field strength.

Figure 7:
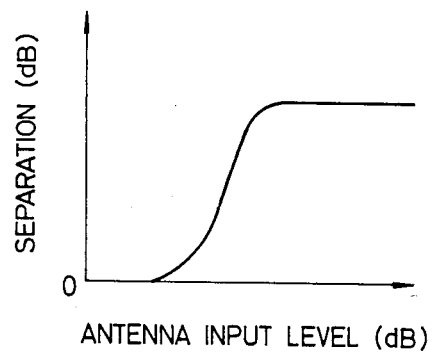
FIG. 7 is a graphical representation indicating the separation characteristic of the tuner in FIG. 3.

As is apparent from FIGS. 5 and 6, the voltage-controlled attenuator 15 is so designed that in the stereo mode the maximum attenuation can be large (for instance, effectively infinite), so that, when the field strength is weak or when the field strength is decreased by a multipath operation, the sub-signal (L - R) is continuously attenuated as a function of field strength to substantially be monaural. This level attenuation of the sub-signal provides a characteristic of separation with antenna input level as shown in FIG. 7.

On the other hand, as is apparent from FIGS. 5 and 6, in the bilingual mode, the maximum attenuation of the attenuator 15 is small when compared with that of the attenuator 15 in the stereo mode. Therefore, the sub-signal is to a greater or lesser extent outputted even when the field strength is decreased.

Figure 8:
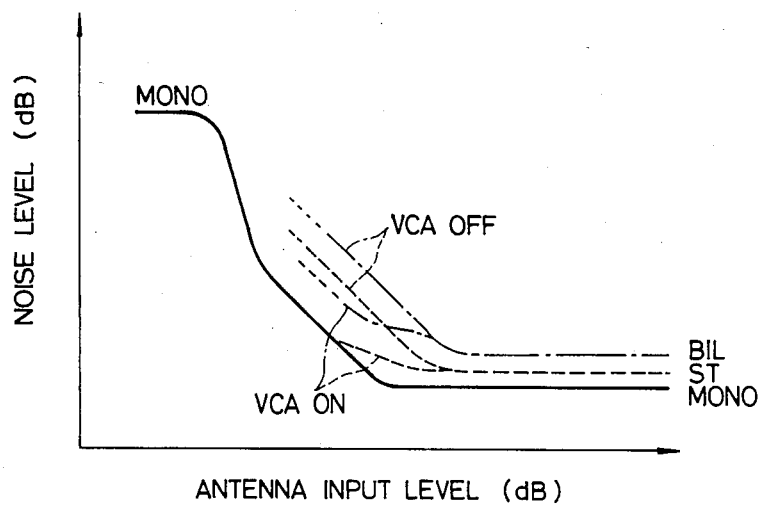
FIG. 8 is a graphical representation indicating the noise characteristics of the tuner shown in FIG. 3 and those of a conventional sound multiplex television tuner.

FIG. 8 is a graphical representation indicating the fact that the voltage-controlled attenuator 15 decreases the noise level to thereby improve the antenna input level vs. noise level characteristic in situations of low antenna input power.

Figure 10:
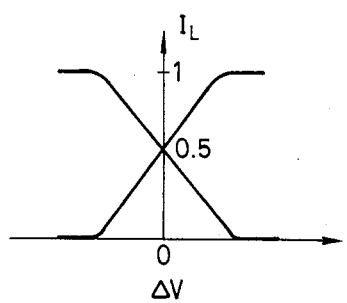
FIGS. 10 and 11 are graphical representations indicating the operating characteristics of the voltagecontrolled attenuator shown in FIG. 9.
Figure 9:
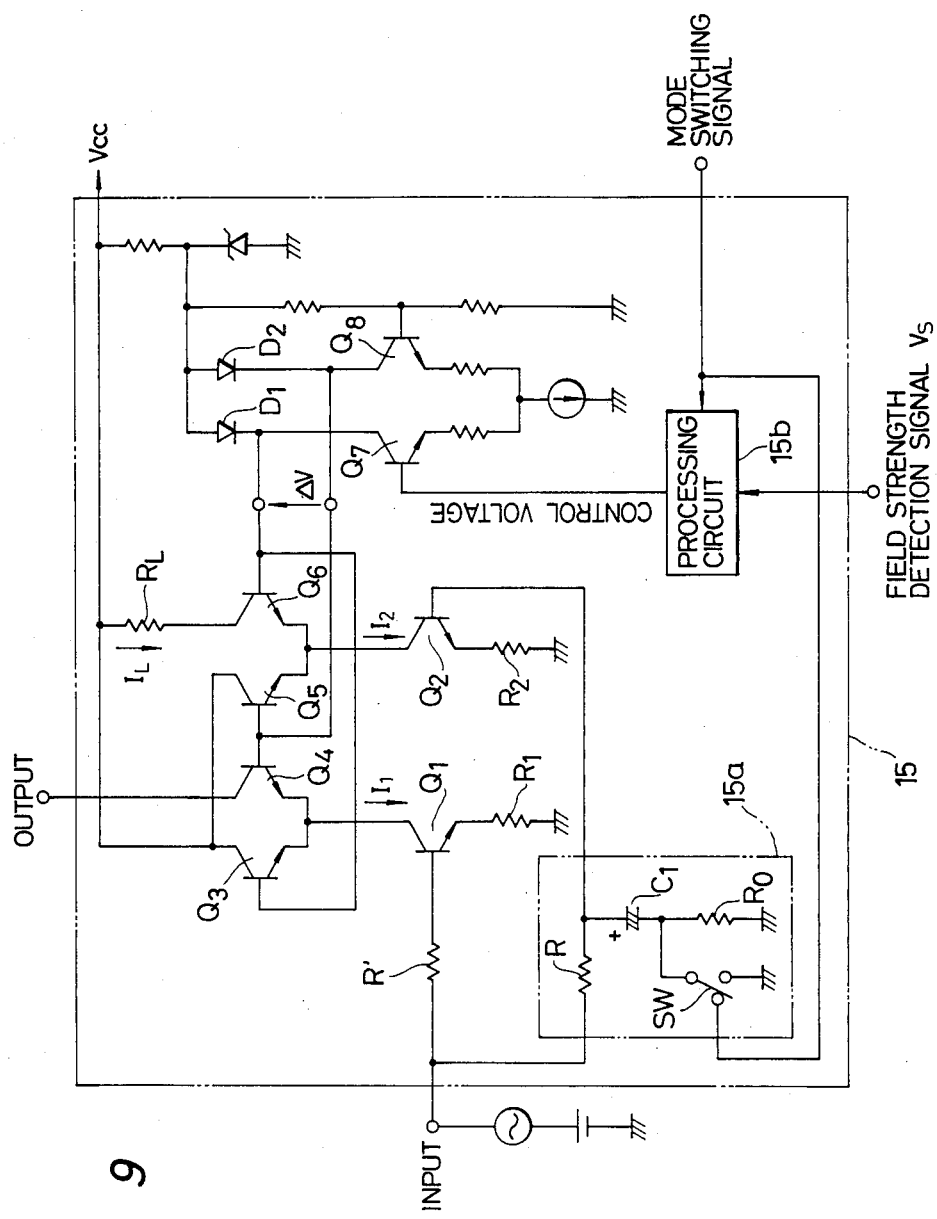
FIG. 9 is a circuit diagram showing a concrete example of the voltage-controlled attenuator in FIG. 3.

FIG. 9 shows a specific example of the above-described voltage controlled attenuator 15. A sound signal superposed on a DC signal is applied to the input terminal of the attenuator 15. The sound signal is applied through a resistor R' to the base of a transistor $Q_1$ and through an attenuation circuit 15a to the base of a transistor $Q_2$. The voltages applied to the bases of the transistors $Q_1$ and $Q_2$ are converted into currents $I_1$ and $I_2$ by resistors $R_1$ and $R_2$, respectively. These currents $I_1$ and $I_2$ are controlled as shown in FIG. 10 by a voltage V which is applied between the connecting point of the bases of transistors $Q_4$ and $Q_5$ and the connecting point of transistor $Q_3$ and $Q_6$.

The attenuation circuit 15a comprises resistors R and $R_o$, a capacitor $C_1$, and a switch SW. In the stereo mode, the switch is turned on so that the maximum attenuation of the circuit 15a becomes infinite. In the bilingual mode, the switch SW is turned off so that the maximum attenuation is set to $R_0/(R+R_0)$.

When the sound signal is sufficiently attenuated by the attenuation circuit 15a, the above-described currents $I_1$ and $I_2$ can be represented by the following expressions:

$$I_1 = I_s + I_0$$

$$I_2 = I_0$$

where $I_s$ is the sound signal component and $I_0$ is the DC component.

If the voltage $\Delta V$ is sufficiently high on the positive (+) side, the transistors $Q_4$ and $Q_5$ are cut off. Therefore, $I_L = I_2 = I_0$ where $I_L$ is the current flowing in a load resistor $R_L$. That is, only the DC component appears at the output terminal. If, on the other hand, the voltage $\Delta V$ is sufficiently high on the negative (−) side, the transistors $Q_3$ and $Q_6$ are cut off. Therefore, $I_L = I_1 = I_s + I_0$. The sound signal is provided at the output terminal. In this case, the voltage amplification factor is unity, $Gv = 1$, if $R_2 = R_L$. If $\Delta V = 0$, then $I_1$ and $I_2$ are each divided into two parts, and $I_1 = I_1/2 + I_2/2 = I_s/2 + I_0$ is established. Therefore, the DC voltage is maintained unchanged, and $Gv = 0.5$.

The above changes of $I_L$ with respect to $\Delta V$ are illustrated in FIG. 10.

Figure 11:
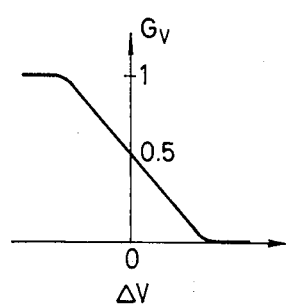

As is apparent from the above description, $I_L$ changes with $\Delta V$, and the ratio of $I_1$ and $I_2$ in $I_L$ changes. Therefore, the amplification factor Gv changes as shown in FIG. 11. That is, $$I_L = k \cdot I_1 + (1-k) \cdot I_2 = k \cdot I_2 + I_0$$

where k varies with $\Delta V$ and has values between 0 and 1.

Therefore, a voltage-controlled attenuation with no DC variation is obtained.

The voltage $\Delta V$ is formed by transistors $Q_7$ and $Q_8$, etc. by utilizing a control voltage which a processing circuit 15b provides according to the field strength detection signal Vs and the mode switching signal. The transistors $Q_7$ and $Q_8$, etc. are used to linearly change the voltage amplification degree Gv with respect to the control voltage.

Figure 12:
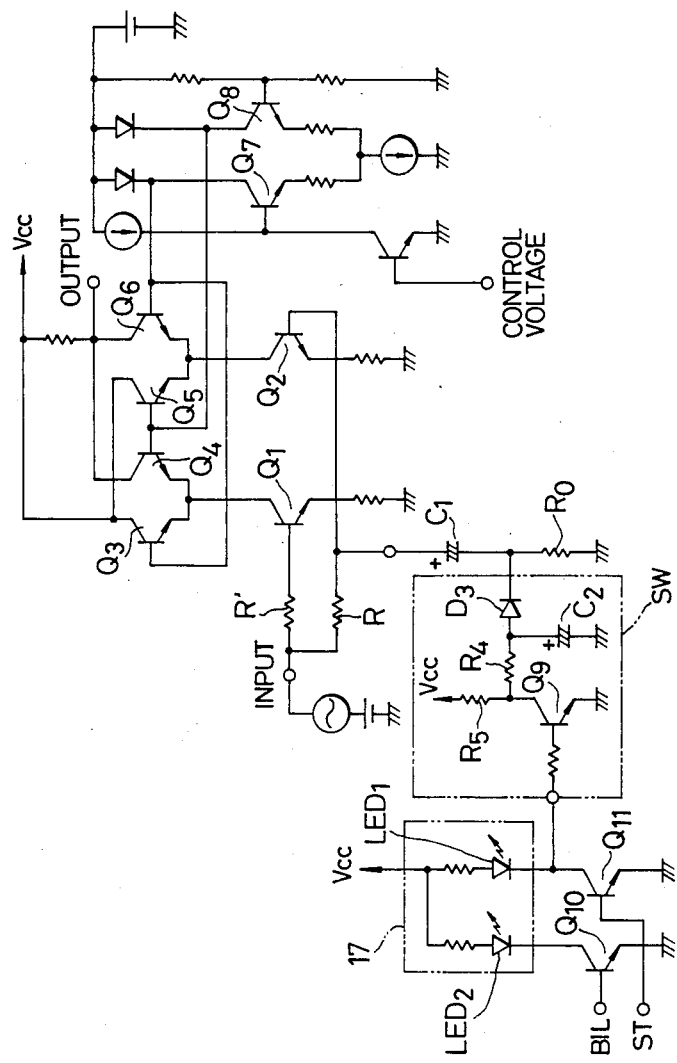
FIG. 12 is a circuit diagram showing a part of the circuit of FIG. 9 in more detail.

FIG. 12 shows a specific example of the switch SW of the voltage-controlled attenuator shown in FIG. 9. In the stereo (ST) mode, a transistor $Q_{11}$ is turned on, so that a "STEREO" displaying light emitting diode $LED_1$ in a mode displaying section 17 is caused to emit light, while a transistor $Q_9$ in the switch SW is turned off, so that a diode $D_3$ is turned on. As a result, current flows through resistors $R_5$, $R_4$ and $R_0$. Also, the connecting point of the capacitor $C_1$ and the resistor $R_0$ is grounded through the diode $D_3$ and a capacitor $C_2$, so that the switch SW is held turned on.

On the other hand, in the bilingual (BIL) mode, a transistor $Q_{10}$ is turned on, so that a "BILINGUAL" displaying light emitting diode $LED_2$ in the mode displaying section 17 is caused to emit light. In this operation, the transistor $Q_{11}$ is non-condutive (off), while the transistor $Q_9$ is conductive (on). Therefore, with the diode $D_3$ maintained turned off, the switch SW is held turned off. The resistor $R_4$ determines a time constant together with the resistor $R_5$ and the capacitor $C_2$. The time constant is used to suppress the generation of noise during the on-off operation.

In the above-described sound multiplex television tuner, only the maximum attenuation is varied. However, a method in which, in the bilingual mode, the field strength at which the operation of the voltage-controlled attenuator starts is set to a lower value, or a method in which the effect of the voltage-controlled attenuator on the field strength variation is reduced may be employed, or the two methods may be employed in combination.

Figure 13:
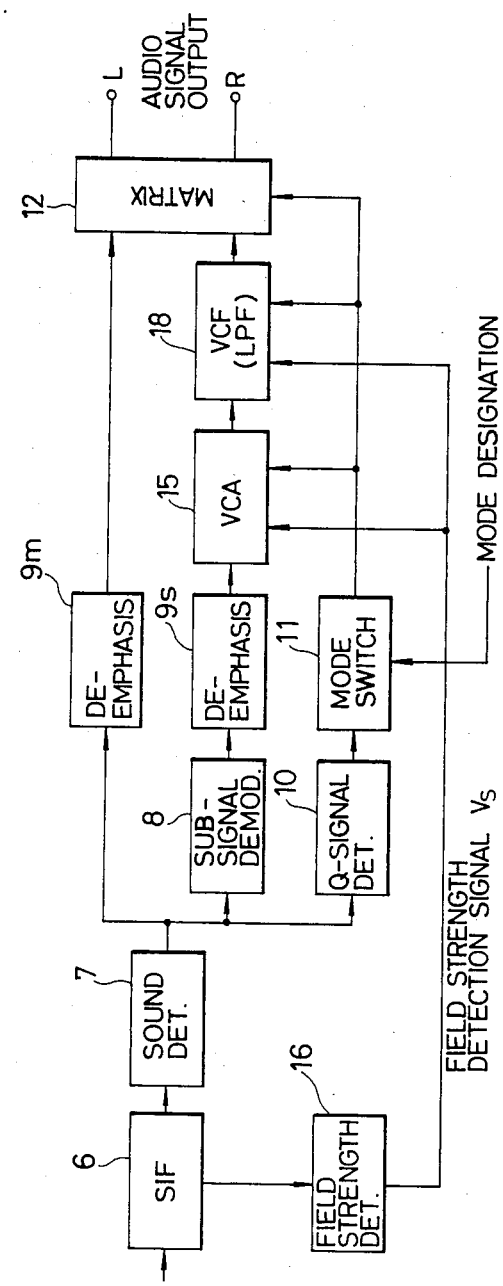
FIG. 13 is a block diagram showing a second example of the sound multiplex television tuner according to the invention.
Figure 14:
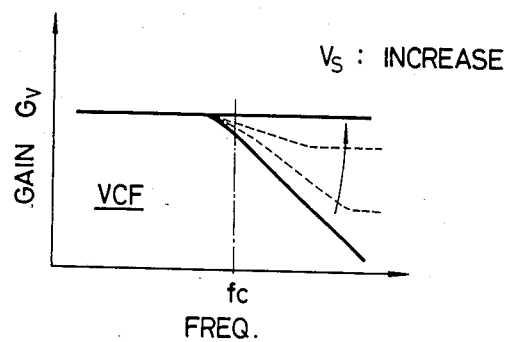
FIG. 14 is a graphical representation indicating the output characteristic of a voltage-controlled filter in FIG. 13.

FIG. 13 shows a second example of the sound multiplex television tuner according to the invention. The sound multiplex television tuner of FIG. 13 is different from that of FIG. 3 in that it includes a voltage-controlled filter (VCF) 18. The voltage-controlled filter 18 operates as a low-pass filter which, when the mode switching signal from the mode switching circuit 11 indicates the bilingual mode, continuously attenuates the high frequency component of the demodulation output of the sub signal demodulation circuit 8, which has passed through the voltage-controlled attenuator 15. The voltage-controlled filter 18 is partially controlled by the field strength detection signal Vs provided by the field strength detection circuit 16. The frequency vs. gain characteristic of the filter 18 changes with the field strength detection signal Vs as indicated in FIG. 14.

Figure 15:
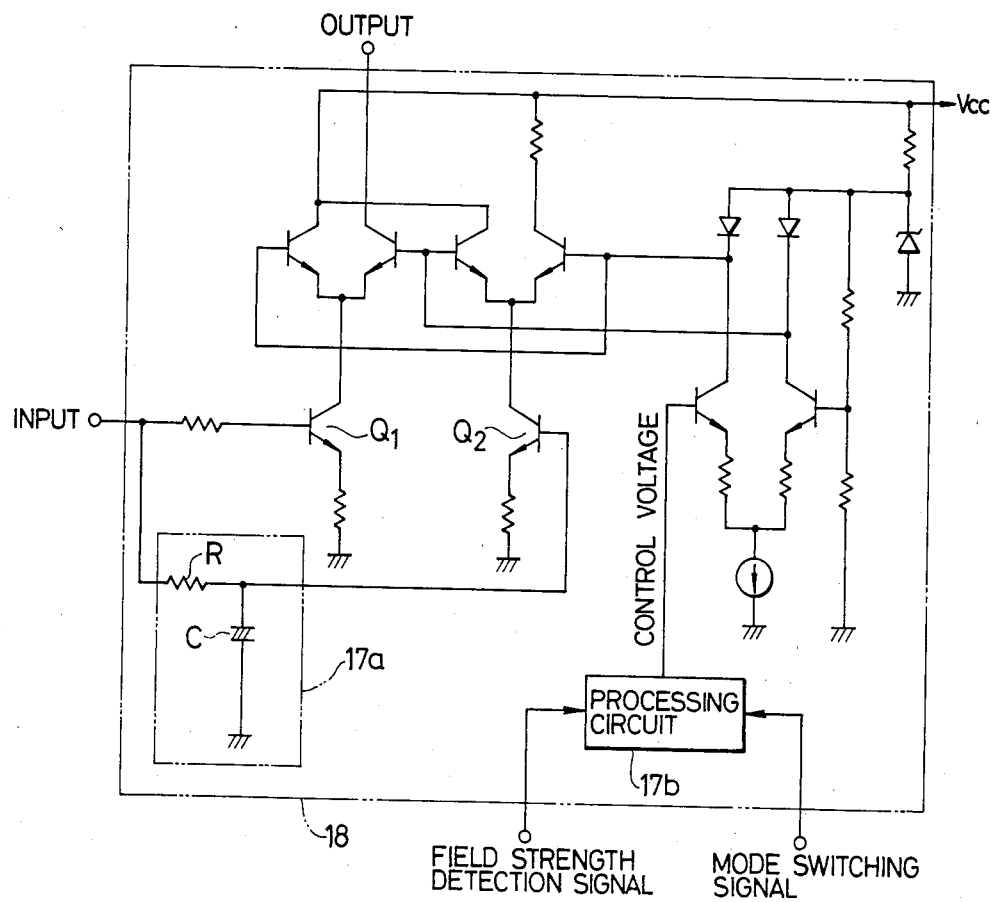
FIG. 15 is a circuit diagram showing a concrete example of the voltage-controlled filter shown in FIG. 13.

A specific of example of the voltage-controlled filter 18 is shown in FIG. 15, and is substantially equivalent to the circuit of FIG. 9 if the attenuation circuit 15a in the voltage-controlled attenuator 15 of FIG. 9 is replaced by an RC circuit 17a, illustrated in FIG. 15. The resistor R and the capacitor C of the RC circuit 17a determine the cutoff frequency fc of FIG. 14. If the cutoff frequency fc is suitably determined, then, in the range of frequencies lower than the cutoff frequency, Gv is constant. Also, in the range of frequencies higher than cutoff frequency, Gv can be continuously controlled by the field strength voltage signal Vs.

For instance, in the stereo mode, only the voltage-controlled attenuator 15 is operated with the maximum attenuation, effectively set to infinity. On the other hand in the bilingual mode, the sense of incongruity needs to be taken into consideration. First the voltage-controlled filter 18 is operated, and when the field strength is decreased, the voltage-controlled attenuator 15 is operated with a small attenuation or it settles at a constant value for very low field strengths.

Figure 16A:
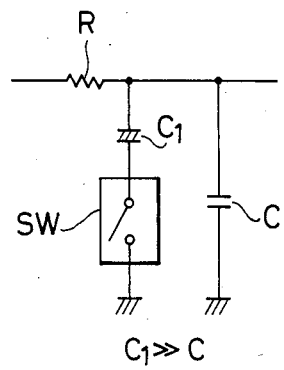
FIGS. 16A and 16B are circuit diagrams showing modifications of a part of the circuit shown in FIG. 9.

In the sound multiplex television tuner of FIGS. 13, the voltage-controlled attenuator 15 and the voltage-controlled filter 18 are provided individually. However, replacement of the attenuation circuit 15a of FIG. 9 by a circuit shown in FIG. 16A results a circuit which, in the stereo mode, operates as the voltage-controlled attenuator with the maximum attenuation, effectively infinite, since the switch SW is turned on. However, in the bilingual mode, the circuit operates as the voltage-controlled filter since the switch SW is turned off. This dual operation requires that the capacitance C be much less than $C_1$. If the circuit thus formed is employed instead of the voltage-controlled attenuator 15 in FIG. 3, then it can be used selectively for the different modes.

Figure 16B:
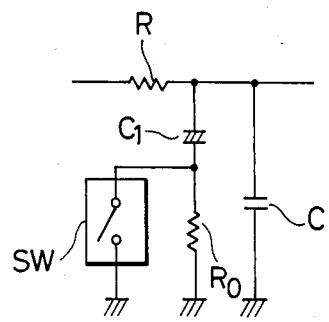

Replacement of the attenuation circuit 15a of FIG. 9 by a circuit shown in FIG. 16B produces a circuit which, in the stereo mode, operates as the voltage-controlled attenuator since the switch SW is turned on, and, in the bilingual mode, operates as the voltage-controlled attenuator and voltage-controlled filter since the switch SW is turned off. In this case, the operating points of the voltage-controlled attenuator and the voltage-controlled filter cannot be changed.

In the above-described examples of the audio multiplex television tuner of the invention, the sub-signal demodulation cicuit 8 and the voltage-controlled attenuator 15 are provided individually. However, if the demodulation efficiency of the sub-signal demodulation circuit is controlled, then it is unnecessary to individually provide the voltage-controlled attenuator. The de-emphasis circuits 9m and 9s may be provided at the rear stage of the matrix circuit 12. Furthermore in FIG. 13, the positional order of the voltage-controlled attenuator and the voltage-controlled filter may be reversed.

In the case of the split carrier system, the main signal is scarcely affected by multi-path operation, and therefore processing only the sub-signal as described above is sufficiently practical. However, in the case of the inter-carrier system, the main signal also should be processed in the same manner. If, in this case, the sense of incongruity is serious, then only the voltage-controlled filter is used. When the mode is switched, the changing of the operation is not always necessary for the main signal. However, since the content of the program source is changed, for instance, from music to voice when the mode is switched, the changing of the operation will provide a satisfactory result. It goes without saying that not only in the case of the inter-carrier system but also in the case of the split carrier system, processing the main signal also in the same manner is effective.

In addition, the voltage-controlled attenuator and the voltage-controlled filter together with the sound multiplex demodulation circuit can be provided in the form of a single-chip integrated circuit at low manufacturing cost.

Figure 2:
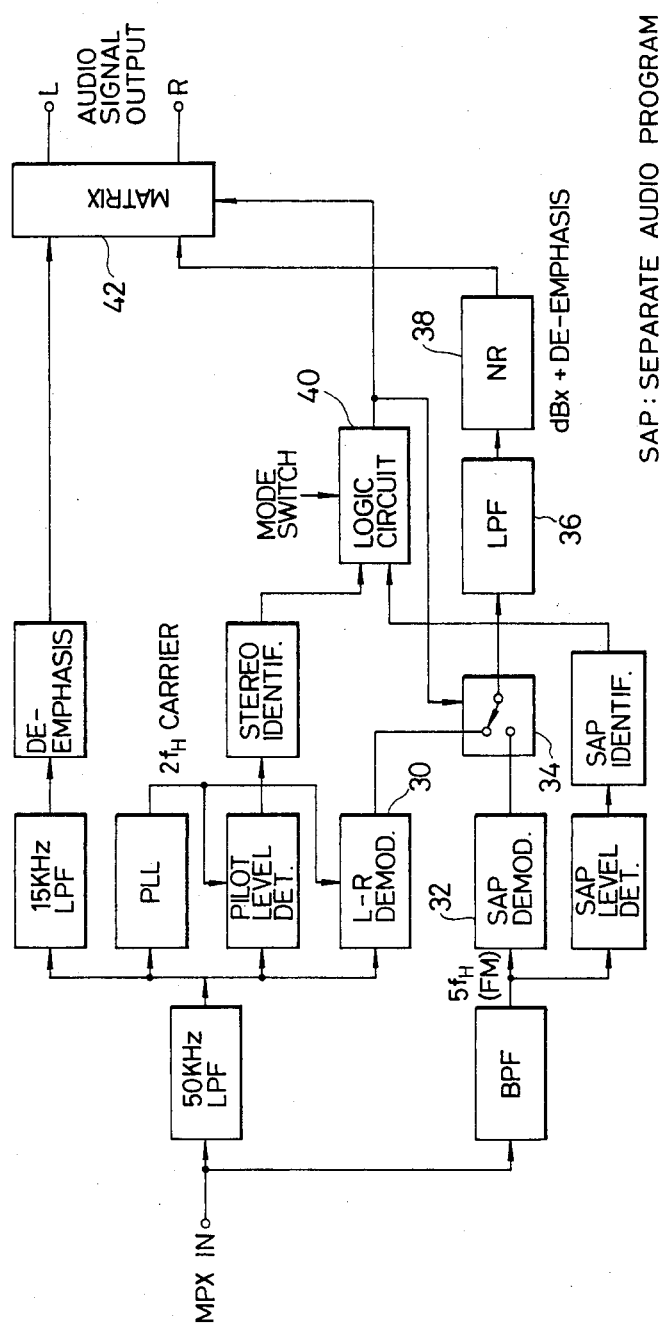
FIG. 2 is a block diagram of another conventional tuner.
Figure 17:
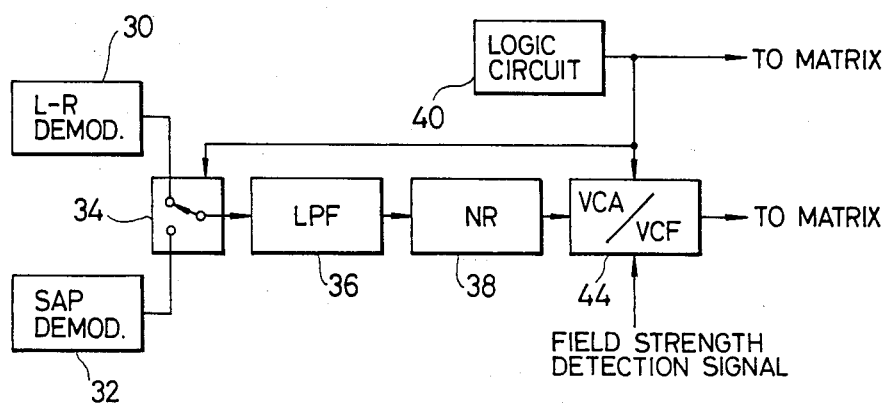
FIG. 17 is a block diagram showing a third example according to the present invention made on the basis of the prior art shown in FIG. 2.

In FIG. 17 is shown a modification of the circuit of FIG. 2 in which a VCA/VCF 44 (voltage controlled attenuator/voltage controlled filter), controlled by a logic circuit 40, and field strength detection signal, is inserted between a noise reduction circuit 38 and a matrix 42. All but the VCA/VCF 44 are found in FIG. 2. Operation of the circuit is similar to that of the stereo mode at the time of stereophonic reproduction and similar to that of the bilingual mode at the time of SAP, all according to the U.S. approach.

As was described above, according to the invention, the operation of the level control means is changed according to a given sound multiplex mode so that it is most suitable for the sound multiplex mode. Therefore, noise can be supprssed without causing the person to feel a sense of incongruity.

What is claimed is:
1. A sound multiplex tuner for decoding an input signal comprised of an encoded main signal and an encoded subsignal, to provide audio output signals, said sound multiplex tuner comprising:
- a subsignal circuit comprising means for demodulating said encoded subsignal from said input signal before said encoded main signal and said encoded subsignal are subjected to said decoding;
- a field strength detector for detecting a field strength of said input signal;
- lever control means, responsive to said field strength detector, for continuously attenuating said encoded subsignal when said field strength is less than a predetermined value, said level control means being provided in said subsignal circuit;
- means for selecting the operation of said sound multiplex tuner to any one of a plurality of modes corresponding to a plurality of possible input signals modes; and
- wherein said level control means has a characteristic of response switched according to said selected mode.

2. A sound multiplex tuner as recited in claim 1, wherein said level control means comprises a low-pass filter that attenuates at frequencies higher than a low-pass band to a greater degree when said detected field strength is less than a predetermined value.

3. A sound multiplex tuner as recited in claim 2, wherein said low-pass filter further comprises a time constant circuit for smoothing said sub-signal.

4. A sound multiplex tuner as recited in claim 1, wherein said level control means comprises a variable attenuator, a degree of attenuation of said sub-signal being controlled inversely to said detected field strength over a range of said detected field strength less than said predetermined value.

5. A sound multiplex tuner as recited in claim 4, wherein said plurality of modes comprise a stereo mode and an alternate audio channel mode and wherein said level control means, when said field strength is less than said predetermined value, attenuates said sub-signal more when said stereo mode has been selected than when said alternate audio channel mode has been selected.

6. A sound multiplex tuner as recited in claim 1, wherein said level control means comprises a variable attenuator, a degree of attenuation of said sub-signal being controlled inversely to said detected field strength over a range of said detected field strength less than said predetermined value.

7. A sound multiplex tuner as recited in claim 6, wherein said level control means comprises a low-pass filter that attenuates at frequencies higher than a low-pass band to a greater degree when said detected field strength is less than a predetermined value.

8. A sound multiplex tuner as recited in claim 6, wherein said attenuator further comprises a time constant circuit for smoothing said sub-signal.

* * * * *